(12) United States Patent
Friedrich

(10) Patent No.: US 6,899,462 B2
(45) Date of Patent: May 31, 2005

(54) LINEAR ANTIFRICTION BEARING

(75) Inventor: Horst Friedrich, Herschweiler-Pettersheim (DE)

(73) Assignee: Ina-Schaeffler KG (DE)

( * ) Notice: Subject to any disclaimer, the term of this patent is extended or adjusted under 35 U.S.C. 154(b) by 0 days.

(21) Appl. No.: 10/351,893

(22) Filed: Jan. 24, 2003

(65) Prior Publication Data

US 2003/0161556 A1 Aug. 28, 2003

Related U.S. Application Data

(63) Continuation of application No. PCT/EP01/07003, filed on Jun. 21, 2001.

(30) Foreign Application Priority Data

Jul. 25, 2000 (DE) .......................... 100 36 016

(51) Int. Cl.[7] .............................. F16C 29/06
(52) U.S. Cl. .......................................... 384/45
(58) Field of Search ............................... 384/45, 43, 44; 464/168

(56) References Cited

U.S. PATENT DOCUMENTS

| | | |
|---|---|---|
| 3,071,418 A | 1/1963 | Hayes |
| 4,647,226 A | 3/1987 | Mottate .................... 384/45 |
| 4,778,284 A | 10/1988 | Teremachi ................ 384/45 |
| 4,799,806 A | 1/1989 | Seki ......................... 384/45 |
| 4,806,022 A | 2/1989 | Takahiro .................. 384/45 |
| 4,917,508 A | 4/1990 | Mottate .................... 384/45 |
| 5,575,565 A | 11/1996 | Takei et al. ............... 384/45 |

FOREIGN PATENT DOCUMENTS

| | | |
|---|---|---|
| DE | 1966974 | 8/1967 |
| DE | 2941065 | 4/1981 |
| DE | 2522749 | 2/1983 |
| DE | 3627169 | 3/1987 |
| DE | 4119135 | 12/1992 |
| DE | 19614513 | 10/1997 |
| JP | 58-128526 | 8/1983 |
| JP | 2-142918 | 6/1990 |
| JP | 2000-320638 | 11/2000 |

*Primary Examiner*—Leonard A. Footland
(74) *Attorney, Agent, or Firm*—Ostrolenk, Faber, Gerb & Soffen, LLP

(57) ABSTRACT

In a linear antifriction bearing comprising a guide rail (1) which has a U-shaped cross section and on whose inner side raceways (4) parallel to the rail longitudinal direction are arranged, and comprising a running carriage (2) which can be displaced longitudinally and is supported by rolling elements (3) on the raceways (4) inside the guide rail (1), the rolling elements (3) are arranged in a plurality of endless tracks on a supporting body (5) of the running carriage (2). According to the invention, the supporting body (5) has an opening parallel to the raceways (4), and return channels are formed by a filling body (8) which is arranged in the opening and which has recesses (15) which run in the longitudinal direction to accommodate returning rolling elements (3).

10 Claims, 3 Drawing Sheets

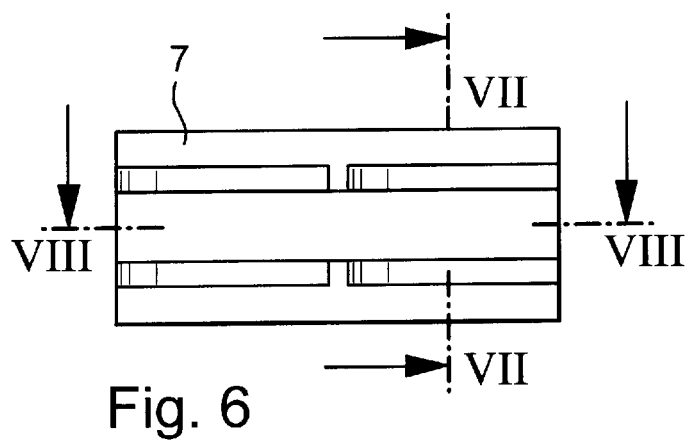 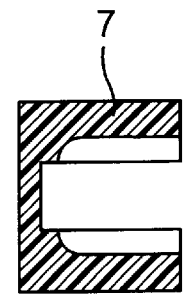
Fig. 6  Fig. 7
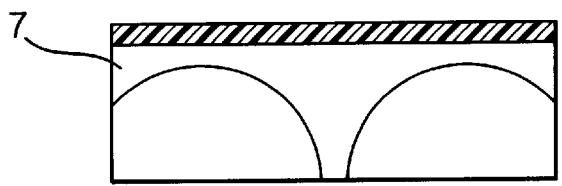 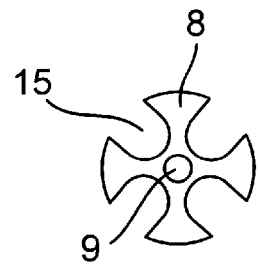
Fig. 8  Fig. 9
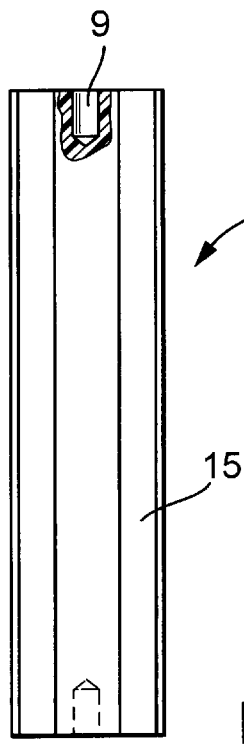 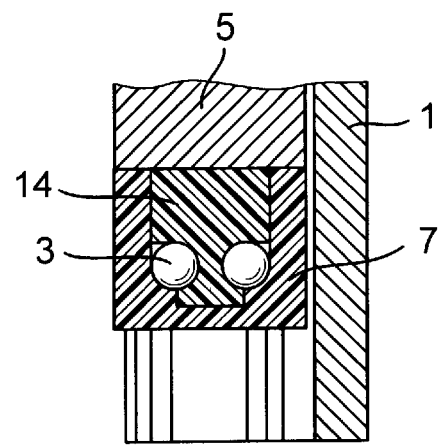
Fig. 10  Fig. 11

US 6,899,462 B2

LINEAR ANTIFRICTION BEARING

CROSS-REFERENCE TO RELATED APPLICATION

This is a continuation application of PCT/EP01/07003 filed Jun. 21, 2001, which PCT application claims priority of German application number 100 36 016.5 filed Jul. 25, 2000. The PCT International application was published in the German language.

FIELD OF THE INVENTION

The invention relates to a linear antifriction bearing comprising a guide rail which has a U-shaped cross section and on whose inner side raceways parallel to the rail longitudinal direction themselves arranged, and comprising a running carriage which can be displaced longitudinally and is supported by rolling elements on the raceways inside the guide rail, the rolling elements being arranged in a plurality of endless tracks on a supporting body of the running carriage, and each track having a row of supporting rolling elements, a row of returning rolling elements and two rows of rolling element deflection means that connect these rows to one another, and in each case the row of supporting rolling elements being arranged on raceways facing outward on the running carriage, and the row of returning rolling elements being arranged in a return channel of the supporting body.

Linear guides which are constructed as so-called sheet metal guides can have U-shaped cross sections both in the case of the guide rail and in the case of the running carriage. Although these can often be produced cost-effectively, they are not suitable for guiding high loads. Ball track guides with solid supporting bodies are certainly distinguished by a low installation space and a high loadbearing capacity, but cannot be produced cost-effectively, since in each case a plurality of individual bores, through which the rolling elements are guided back, have to be arranged in the supporting body.

A linear antifriction bearing having a U-shaped guide rail is disclosed by the document DE 36 27 169 C2. In the case of this bearing, however, no measures are provided to prevent the rolling elements falling out of the running carriage if the latter is removed from the guide rail.

The document U.S. Pat. No. 4,799,806 shows a linear antifriction bearing in which the rolling elements are guided in return and deflection channels made of plastic. Each return channel is of divided design in the longitudinal direction, part being kept in holding openings in the supporting body and having to be matched thereto. The result here is therefore a complicated construction, for which the tooling costs are relatively high.

The document U.S. Pat. No. 4,917,508 shows a bearing whose running carriage comprises supporting elements with rolling element raceways and two covering plates, which perform the action of holding the rolling elements. In this case, the supporting elements and the covering plates are firmly riveted to one another. This makes it necessary to align the supporting plates very exactly in order to ensure that all the rolling elements are loaded with the same load.

A linear antifriction bearing of the type mentioned at the beginning is disclosed by the document DE 196 14 513 A1. In the case of this bearing, two rolling element tracks of a running carriage are formed by two supporting elements provided with running grooves and a common guide plate with two continuous internal recesses, into which the supporting elements and the rolling elements are inserted, so that here, too, the result is a complicated and therefore expensive construction.

SUMMARY OF THE INVENTION

The invention is based on the object of developing a linear guide with a U-shaped rail cross section which can be produced cost-effectively and makes it possible to guide high loads in an extremely small installation space.

According to the invention, this object is achieved in that the supporting body has an opening parallel to the raceways, and the return channel is in each case formed by a filling body which is arranged in the opening and, for each rolling element track, is provided with a continuous recess which runs in the longitudinal direction and in which the returning rolling elements are arranged.

The opening can be designed as a circularly cylindrical bore and the filling body as an insert inserted suitably into the opening in the supporting body and having a substantially circularly cylindrical outer surface. It is also possible to design the opening and the filling body in the shape of a polygon or with an oval cross section. Deflection bodies can be arranged for guiding the rows of rolling element deflection means at the two ends of the supporting body pointing in the displacement direction. The insert can have the same length as the supporting body and can end flush with the latter. However, it is also possible for the insert to have a greater length than the supporting body and to project from the latter on both sides, the deflection bodies having matched recesses to accommodate the projecting ends of the insert. The insert can also have a smaller length than the supporting body and be set back on both sides in the latter, it being possible for the deflection bodies to have extensions whose length and shape are matched to the insert. The insert can be connected to the deflection bodies thermally (for example by ultrasonic welding). The deflection bodies can be fixed to the ends of the insert by means of screw connections, internal or external threads being provided at the ends of the insert. The deflection bodies can in each case be formed either in one piece or two pieces.

The filling body can also be formed as a component injection molded on the supporting body within the opening. Therefore, retaining webs for the rolling elements and end pieces can be injection molded on the supporting body in one piece, together with the filling body. In this case, for example, the supporting body is inserted into an injection mold and the filling body with the retaining webs and the end pieces is subsequently injection molded in one piece in one operation. As a last mounting step, the deflection elements are plugged onto the injection molded end pieces and fixed there, for example welded by an ultrasonic process.

BRIEF DESCRIPTION OF THE DRAWING

An exemplary embodiment of the invention is illustrated in the drawing and will be described in more detail in the following text. In the drawing:

FIG. 6 shows an inner view of a deflection body for the running carriage;

FIG. 7 shows a cross section through the deflection body according to the line VII—VII in FIG. 6;

FIG. 8 shows a longitudinal section of the deflection body according to the line VII—VII in FIG. 6;

FIG. 9 shows an insert for the supporting body in an end view;

FIG. 10 shows the insert for the supporting body in a side view;

FIG. 11 shows a partial longitudinal section through the bearing with a deflection piece bearing on the supporting body.

DETAILED DESCRIPTION OF THE DRAWING

Figure 1:
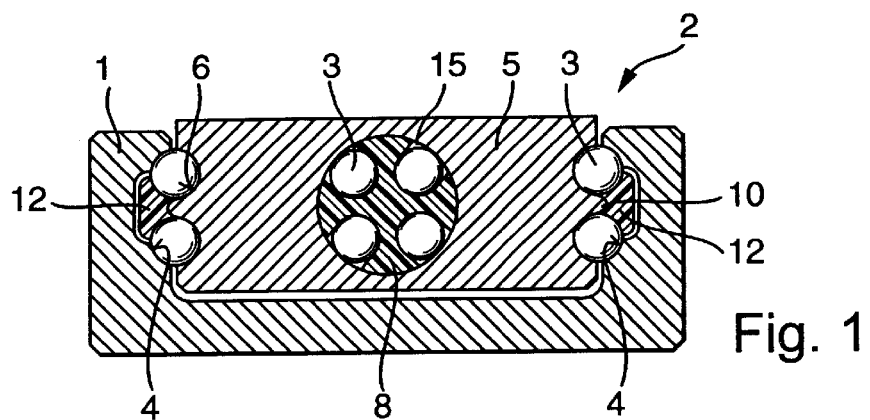
FIG. 1 shows a cross section through the supporting body of the running carriage and the guide rail of a linear bearing according to the invention having four rolling element tracks, according to the line I—I in FIG. 2.
Figure 2:
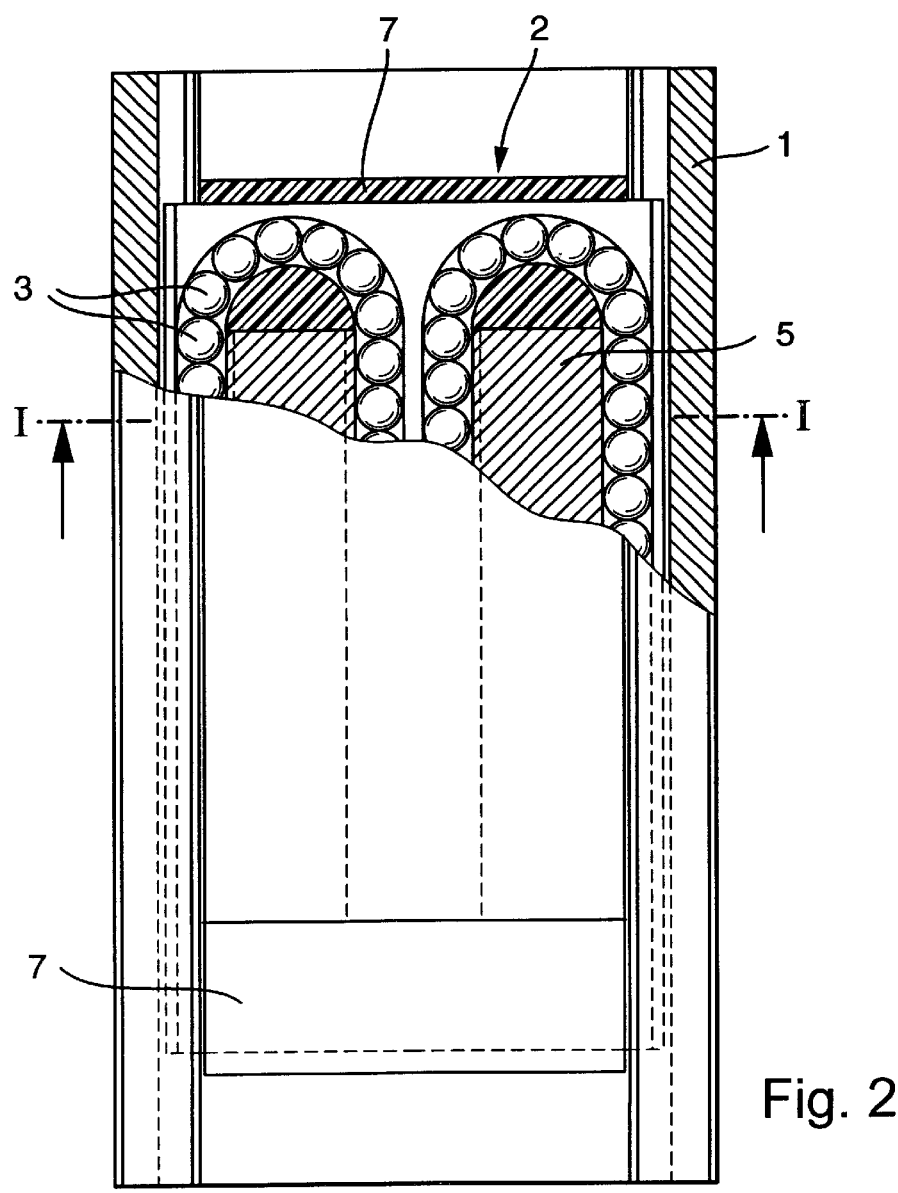
FIG. 2 shows the bearing according to FIG. 1, formed by the guide rail and the running carriage, in a plan view with a partial longitudinal section.
Figure 4:
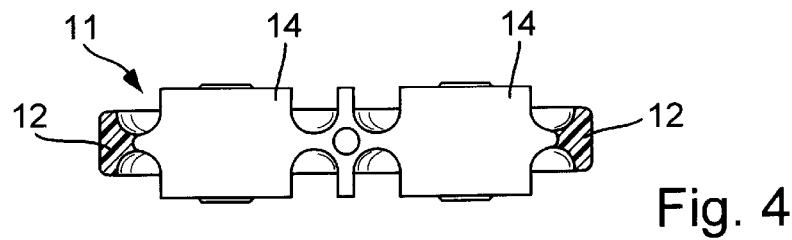
FIG. 4 shows a cross section through the rolling element retaining element according to the line IV—IV in FIG. 3.
Figure 3:
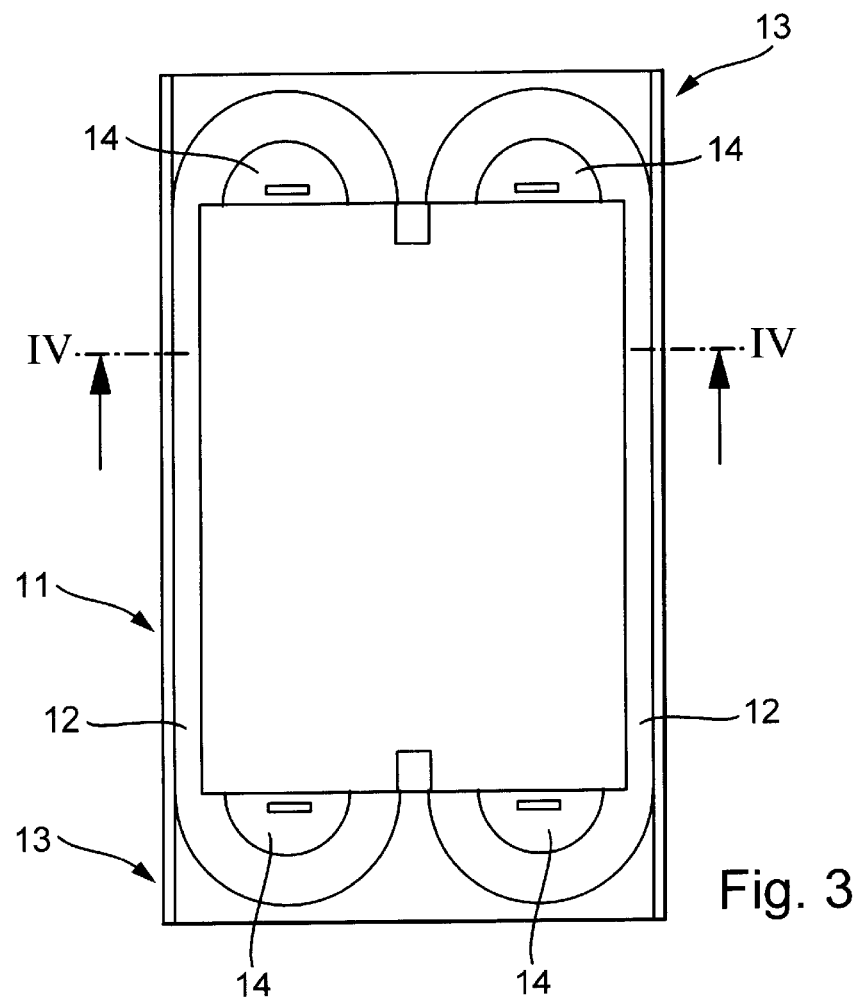
FIG. 3 shows a rolling element retaining element for the supporting body of the bearing in a plan view.
Figure 5:
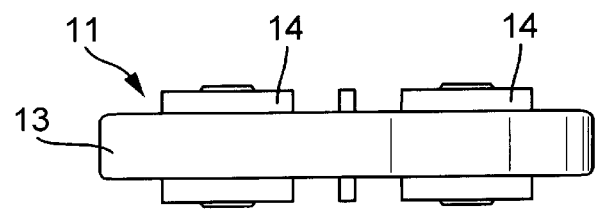
FIG. 5 shows an end view of the rolling element retaining element.

A linear antifriction bearing according to the invention has a guide rail 1 which has a U-shaped cross section and in which a running carriage 2 is arranged such that it can be displaced longitudinally. The latter is supported on raceways 4 of the guide rail 1 by rolling elements 3 formed as balls. The raceways 4 are formed on the inner side of the guide rail 1, on the legs of its U, and extend in the rail longitudinal direction.

The running carriage 2 contains a solid supporting body 5 with a rectangular cross section, on whose longitudinal sides raceways 6 facing outward are formed for the rolling elements 3. These raceways run parallel to the raceways 4 of the rail opposite which they are located. The rolling elements 3 roll between the raceways 6 of the carriage and the raceways 4 of the rail when the running carriage 2 moves in the guide rail 1.

In order that the running carriage 2 can travel unlimited distances on the guide rail 1, the rolling elements 3 are arranged in a plurality of endless tracks in the running carriage 2. In order to achieve uniform running of the running carriage 2 on the guide rail 1 and, at the same time, the highest possible load bearing indices, four ball tracks are provided in the exemplary embodiment. Each ball track comprises a row of supporting rolling elements 3, which is arranged between the respective raceway 4 of the rail and the raceway 6 of the carriage, a row of returning rolling elements 3, which is arranged within the supporting body 5, and two rows of rolling element deflection means which connect these rows to one another and which are arranged in two deflection bodies 7. Each deflection body 7 is fixed so as to bear on one end of the supporting body 5.

In the case of track bearings, it is normal for the rolling elements to be deflected in plastic end plates after passing through the supporting area and to be led back in individual bores in the supporting body, in order to arrive in the supporting area again. In the case of four ball tracks, therefore, four bores would be required in the supporting body for the ball returns. Since the diameter-length ratio of such a bore is unfavorable, the four bores would give rise to high production costs.

According to the invention, the action of returning the rolling elements 3 is made possible by an opening in the supporting body 5, which is parallel to the raceways 4 and 6, and, in the exemplary embodiment, is formed as a central bore. In order that the rolling elements 3 of a plurality of return rows remain separated from one another in this opening, an insert 8 with a star-shaped cross section is inserted into said opening. This insert has a cross section substantially matched to the cross section of the opening in the supporting body 5. It has a plurality of continuous recesses 15 which run in the longitudinal direction and in which the returning rolling elements 3 are arranged. The recesses 15 arranged in the longitudinal direction of the insert 8 can also be designed to be completely closed along their circumference and can be provided with openings to the outer diameter of the insert 8, which openings serve as a lubricant reservoir.

In order to fix the deflection bodies 7 to the ends of the supporting body 5, threads can be introduced into the supporting body, being used to hold screws with which the deflection bodies are screwed on. However, it is more cost-effective to dispense with expensive threads in the supporting body 5 and instead to fix the deflection bodies 7 to the insert 8 at the ends. During the injection molding of the insert 8, in each case a small fixing hole 9 can be arranged at the center of its cross section at the two ends into which hole a screw fixing the deflection body 7 to the insert 8 is screwed.

One further possible way of fixing the deflection bodies 7 to the insert 8 consists in their ultrasonic welding. In order that such screw or welded connections do not need to absorb all the external forces which can occur as a result of shocks or impacts, the insert 8 can be longer than the supporting body 5. The deflection bodies 8 can enclose the insert 8 with a form fit, which prevents these parts being displaced in relation to one another. The same effect is achieved if the insert 8 is shorter than the supporting body 5 and the deflection bodies 3 project into the central opening in the supporting body 5.

In order to prevent the deflection bodies 7 rotating with respect to the supporting body 5, lugs 10 with a V-shaped cross section are formed between the adjacent raceways 6 on each side of the running carriage 2. These lugs can be ground at the same time as the raceways 6 of the carriage and, in relation to their shape and position, are very well suited to position and fix the deflection body 7 to the supporting body 5. In order that the lugs 10 can also perform this function, the deflection bodies 7 must be connected to them. This is done by using an additional component, which acts as a rolling element retaining element 11 and encloses the running carriage 2 on four sides. The longitudinal sides of this component are designed as retaining webs 12 and, in the inner area, are provided with recesses with a V-shaped cross section. The retaining webs 12 are therefore configured in such a way that they may be clipped with a form fit onto the lugs 10 of the supporting body 5.

The two retaining webs 12 of the rolling element retaining element 11 simultaneously also perform the retention of the rolling elements when the running carriage 2 is not yet mounted on the guide rail 1. They are connected to one another by integrally molded end pieces 13. These in each case lie with their inner regions 14 on the supporting body 5. On the outside, rolling element guides are integrally molded on the inner regions 14 of the end pieces 13 and here perform the guidance of the rolling elements 3.

After the insert 8 has been mounted in the supporting body 5 and the rolling element retaining element 11 has been clipped on, the deflection bodies 7 are plugged onto the end pieces 13 with a form fit and are screwed to the insert 8. This ensures reliable circulation of the rolling elements in the linear antifriction bearing.

| Reference numbers | |
|---|---|
| 1 | guide rail |
| 2 | running carriage |
| 3 | rolling elements |
| 4 | raceway of the rail |
| 5 | supporting body |
| 6 | raceway of the carriage |
| 7 | deflection body |
| 8 | insert |
| 9 | fixing hole |
| 10 | lug |
| 11 | rolling element retaining element |
| 12 | retaining web |
| 13 | end piece |
| 14 | inner region |
| 15 | recess |

What is claimed is:

1. A linear antifriction bearing comprising: a guide rail having a U-shaped cross section and the guide rail including first inner side raceways arranged parallel to the rail longitudinal direction, a running carriage displacable longitudinally along the rail, rolling elements supporting the carriage on the first raceways inside the guide rail, the running carriage having a supporting body; the rolling elements being arranged in a plurality of endless tracks on the supporting body for the running carriage; each track having a first row of supporting rolling elements, a second row of returning rolling elements and two rows of rolling element deflection means that connect the first and second rows to one another; second raceways; facing outward on the running carriage, the first row of supporting rolling elements being arranged on the second raceways a return channel of the supporting body, and the second row of returning rolling elements being arranged in the return channel; the supporting body having an opening parallel to the raceways; each channel being formed by a filling body which is arranged in the opening and each return channel having a continuous recess for each rolling element track, which runs in the longitudinal direction and in which the returning rolling elements are arranged, wherein the supporting body opening is a circular cylindrical bore, and the filling body is an insert inserted suitably into the opening in the supporting body, and the insert having a substantially circularly cylindrical outer surface.

2. The antifriction bearing as claimed in claim 1, wherein the filling body is a component injection molded on the supporting body within the opening.

3. The antifriction bearing as claimed in claim 2, further comprising retaining webs for the rolling elements and end pieces injection molded on the supporting body in one piece, together with the filling body.

4. The antifriction bearing as claimed in claim 1, wherein the insert has the same length as the supporting body and ends flush with the supporting body.

5. The antifriction bearing as claimed in claim 1, further comprising deflection bodies for guiding the two rows of rolling element deflection means, the deflection bodies being arranged at two ends of the supporting body which point in the displacement directions.

6. The antifriction bearing as claimed in claim 5, wherein the insert has a greater length than the supporting body and the insert has projecting ends that project from the supporting body on both sides, the deflection bodies having matched recesses to accommodate the projecting ends of the insert.

7. The antifriction bearing as claimed in claim 5, wherein the insert has a smaller length than the supporting body and the insert is set back on both sides in the supporting body, the deflection bodies having extensions with length and shape that are matched to the insert.

8. The antifriction bearing as claimed in claim 5, wherein the insert is thermally connected to the deflection bodies.

9. The antifriction bearing as claimed in claim 5, further comprising screw connections fixing the ends of the insert to the deflection bodies with internal or external threads being provided at the ends of the insert.

10. The antifriction bearing as claimed in claim 5, wherein the deflection bodies are formed in one piece or two pieces.

* * * * *